(12) United States Patent
Kano

(10) Patent No.: US 8,015,467 B2
(45) Date of Patent: Sep. 6, 2011

(54) COMMUNICATION SYSTEM, COMMUNICATION APPARATUS AND COMMUNICATION METHOD

(75) Inventor: Jun Kano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1041 days.

(21) Appl. No.: 11/848,096

(22) Filed: Aug. 30, 2007

(65) Prior Publication Data

US 2008/0059860 A1 Mar. 6, 2008

Related U.S. Application Data

(60) Provisional application No. 60/824,014, filed on Aug. 30, 2006.

(51) Int. Cl.
*H04L 1/18* (2006.01)

(52) U.S. Cl. .................... 714/749; 714/774

(58) Field of Classification Search .............. 714/749, 714/774
See application file for complete search history.

(56) References Cited

U.S. PATENT DOCUMENTS

| | | | |
|---|---|---|---|
| 6,782,047 B1* | 8/2004 | Le et al. | 375/240 |
| 2002/0046379 A1 | 4/2002 | Miki et al. | 714/749 |
| 2005/0190700 A1 | 9/2005 | Melpignano | |
| 2007/0038751 A1* | 2/2007 | Jorgensen | 709/226 |
| 2007/0097982 A1* | 5/2007 | Wen et al. | 370/394 |

FOREIGN PATENT DOCUMENTS

| | | |
|---|---|---|
| JP | 10022983 A | 1/1998 |
| JP | 2002-009741 | 1/2002 |
| JP | 2004500753 A | 1/2004 |
| JP | 2005525049 A | 8/2005 |
| WO | 0135534 A2 | 5/2001 |
| WO | 03096633 A1 | 11/2003 |

OTHER PUBLICATIONS

Japanese language office action and its English language translation for corresponding Japanese application 2006234500 lists the references above.

* cited by examiner

*Primary Examiner* — M. Mujtaba K Chaudry
(74) *Attorney, Agent, or Firm* — DLA Piper LLP (US)

(57) ABSTRACT

In an interpretation interval $INT_{ALL}$ used in a communication system, there are provided a future-direction interval $INT_F$ associated with a 5-bit sequence number (LastSendAckNum) transmitted after LastSendAckNum ±0, and a past-direction interval $INT_P$ associated with a 5-bit sequence number (LastSendAckNum) transmitted prior to LastSendAckNum ±0. A transmitter side encodes a 13-bit sequence number into the 5-bit sequence number while setting, as an upper limit, the 5-bit sequence number associated with the future-direction interval $INT_F$.

15 Claims, 9 Drawing Sheets

FIG.4A

| 0 | 1 | 13 14 | 26 27 28 | 35 36 | 43 44 | 51 52 | 59 60 | 67 68 | 75 |
|---|---|---|---|---|---|---|---|---|---|
| HeaderFormat:1 bit | ack:13 bit | seqNum:13 bit | 1 | data byte 1 | data byte 2 | data byte 3 | data byte 4 | data byte 5 | data byte 6 |
| | | | 00000000 1 | data byte 1 | data byte 2 | data byte 3 | data byte 4 | data byte 5 |
| | | | 00000000 00000000 1 | data byte 1 | data byte 2 | data byte 3 | data byte 4 |
| | | | 00000000 00000000 00000000 00000000 00000000 00000000 00000000 1 |

| 0 | 1 | 13 14 | 18 19 20 | 27 28 | 35 36 | 43 44 | 51 52 | 59 60 | 67 68 | 75 |
|---|---|---|---|---|---|---|---|---|---|---|
| HeaderFormat:1 bit | ack:13 bit | seqNum: 5 bit | 1 | data byte 1 | data byte 2 | data byte 3 | data byte 4 | data byte 5 | data byte 6 | data byte 7 |
| | | | 00000000 1 | data byte 1 | data byte 2 | data byte 3 | data byte 4 | data byte 5 | data byte 6 |
| | | | 00000000 00000000 1 | data byte 1 | data byte 2 | data byte 3 | data byte 4 | data byte 5 |
| | | | 00000000 00000000 00000000 00000000 00000000 00000000 00000000 1 |

HD / PL (PB / DB) — Py

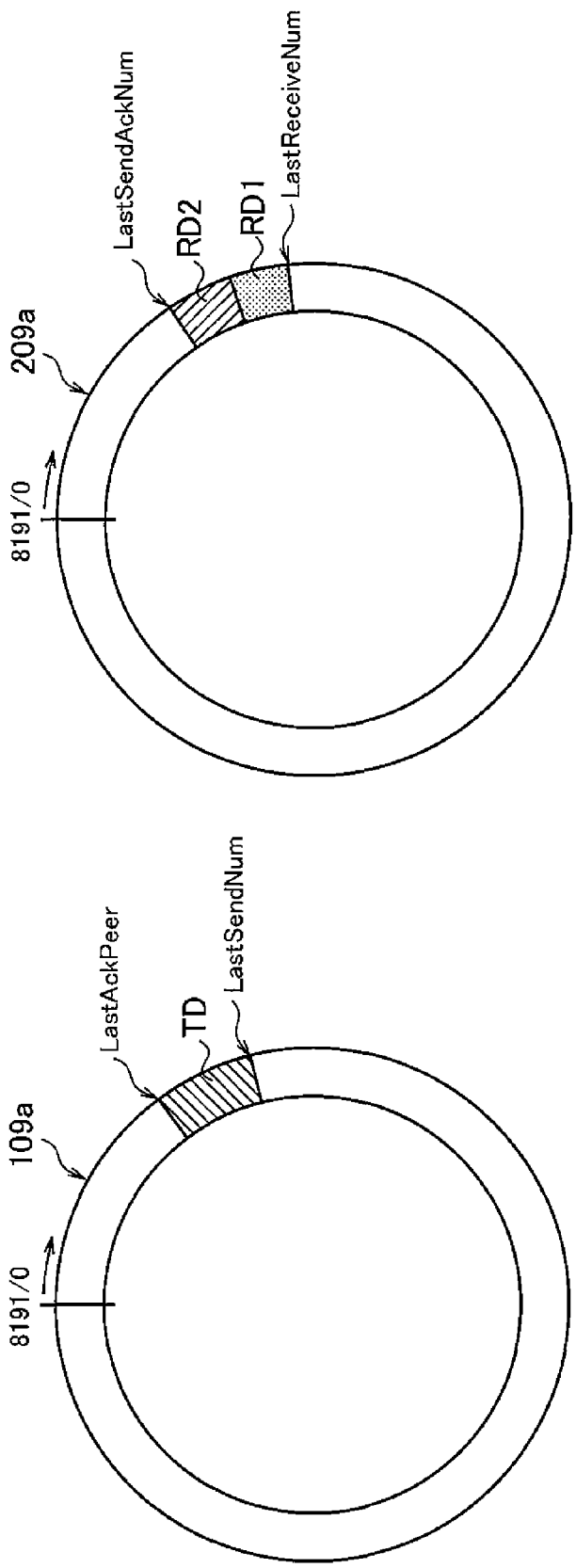
FIG.5B RECEPTION SIDE (WIRELESS BASE STATION 200)
FIG.5A TRANSMISSION SIDE (WIRELESS TERMINAL 100)

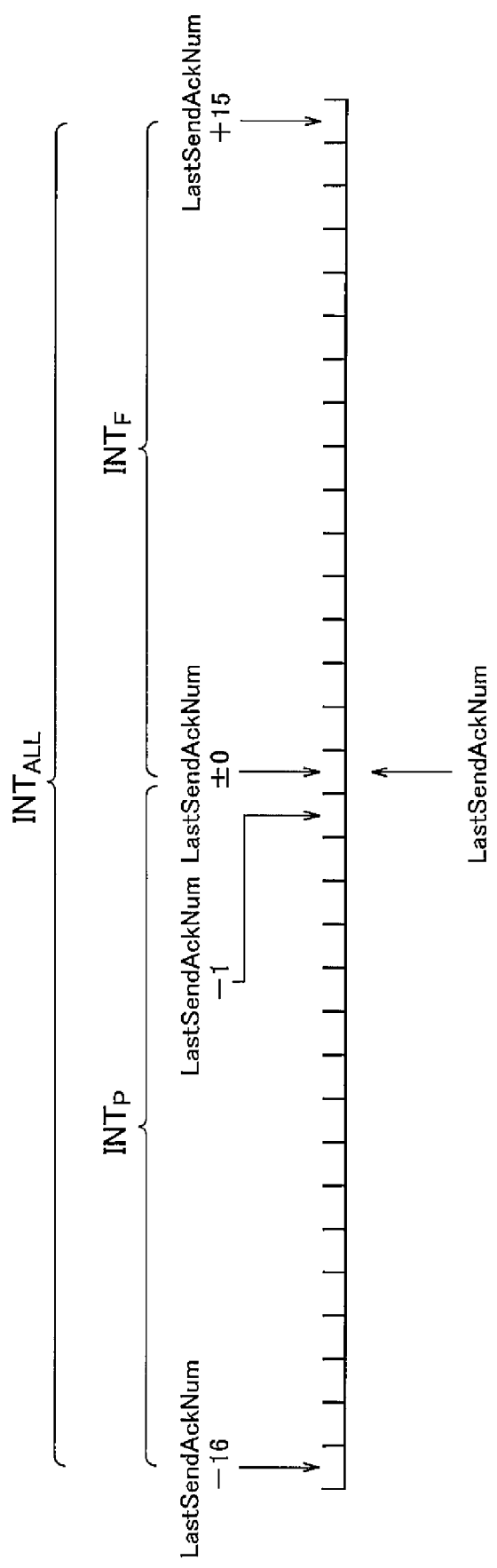

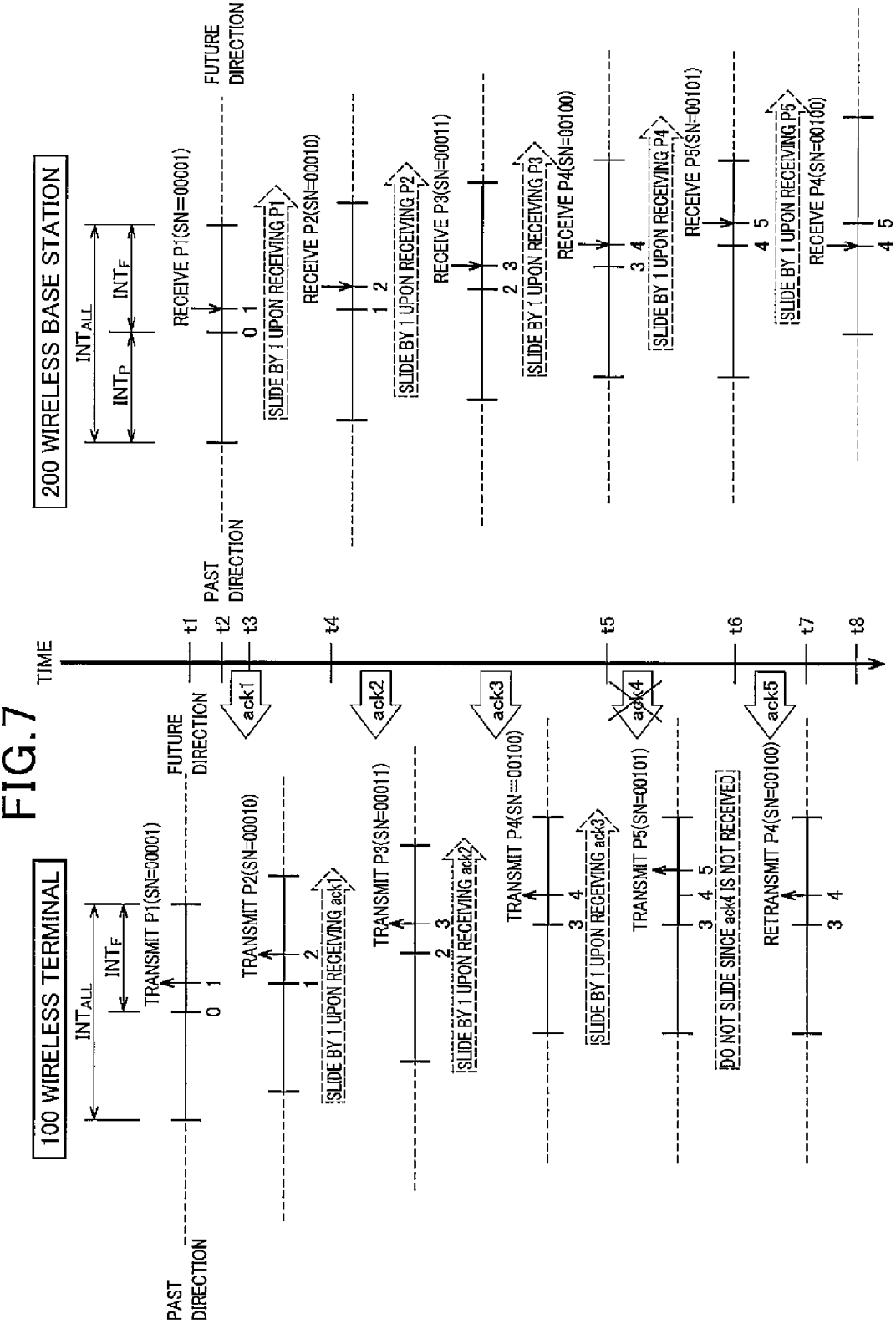

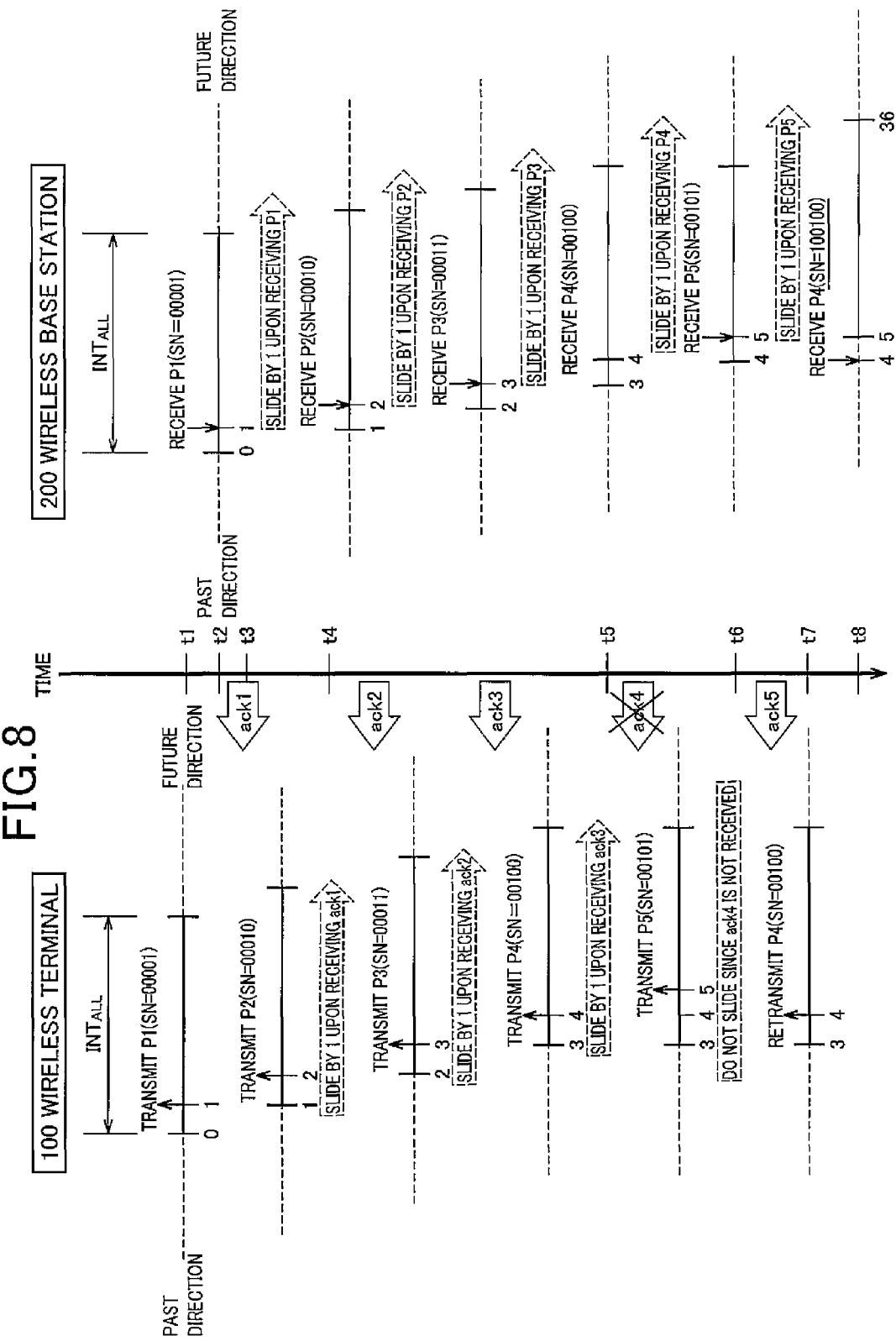

FIG.9

| MSB | | | | | | | | | LSB | | | | SEQUENCE NUMBER |

```
                        FIVE BITS
0 0 0 0 0 0 0 0  0 0 0 0 0    → 0
0 0 0 0 0 0 0 0  0 0 0 0 1    → 1
0 0 0 0 0 0 0 0  0 0 0 1 0    → 2
0 0 0 0 0 0 0 0  0 0 0 1 1    → 3
0 0 0 0 0 0 0 0  0 0 1 0 0    → 4
0 0 0 0 0 0 0 0  0 0 1 0 1    → 5
                ·
                ·
                ·
0 0 0 0 0 0 0 1  0 0 0 0 0    → 32
0 0 0 0 0 0 0 1  0 0 0 0 1    → 33
0 0 0 0 0 0 0 1  0 0 0 1 0    → 34
0 0 0 0 0 0 0 1  0 0 0 1 1    → 35
0 0 0 0 0 0 0 1  0 0 1 0 0    → 36
```

COMMUNICATION SYSTEM, COMMUNICATION APPARATUS AND COMMUNICATION METHOD

BACKGROUND OF THE INVENTION

1. Field of the Invention

The present invention relates to a communication system, a communication apparatus and a communication method, which enable the transmission of only a partial number bit string that is a part of a number bit string to be transferred according to LSB encoding and the like, and which employs a sliding window method. In the sliding window method, an interpretation interval, which is a range of the partial number bit string decodable into the number bit string is sequentially slid.

2. Description of the Related Art

In a wireless communication system such as a mobile communication system, a transmitted packet and the like are frequently lost in a wireless section in comparison with a wired communication system. Accordingly, in general, an automatic retransmission control (for example, an ARQ) to retransmit the lost packet and the like is widely used (for example, refer to Japanese Patent Application Laid-open Publication No. 2002-9741 and "High Capacity-Spatial Division Multiple Access (HC-SDMA) WTSC-2005-032 (ATIS/ANSI)").

Moreover, in the wireless communication system, in order to efficiently utilize a wireless resource such as a frequency band, there are also established a variety of encoding methods of reducing the number of bits of information (compressing information) to be transferred. For example, LSB encoding is known. With the LSB encoding, a transmitter transmits information (partial number bit string) of only the defined number of least significant bits (LSB) form a number bit string (V_target) to be transmitted by the transmitter. The number bit string to be transmitted by the transmitter includes a sequence number used in a header of the packet, or the like.

Since the LSB encoding causes the information of only the defined number of bits from LSB to be transmitted, it is necessary for a receiver to add information of higher-order bits, which has not been transmitted, to the received information of the defined number of LSB, and to decode the received information into the number bit string (V_target).

Specifically, the transmitter and the receiver share a reference value (V_ref). The transmitter transmits the sequence number (SN) as a part of the number bit string to be transferred. When it is assumed that the number of bits of the sequence number (SN) is k bits, the receiver that shares the reference value (V_ref) receives the sequence number (SN), and thereby can interpret a value within a range of V_ref to $V\_ref+2^{k-1}$ as the V_target, that is, as the number bit string to be originally transmitted by the transmitter. Here, the range of V_ref to $V\_ref+2^{k-1}$ is referred to as an "interpretation interval".

Moreover, in the case of using the LSB encoding, a sliding window method is also widely used in order to make it possible to shift the above-described interpretation interval. In the sliding window method, a variable (P) is introduced, and a value used as the reference value (V_ref) is sequentially slid. Specifically, when the partial number bit string is decoded into the number bit string (V_target) by using the sequence number received by the receiver, the reference value (V_ref) is updated in the transmitter and the receiver.

Incidentally, in the wireless communication system, in general, a packet size therein frequently becomes extremely small in comparison with that of the wired communication system. In other words, in order to enhance transfer efficiency of the information per packet, it is desirable that the number of bits assigned to the header of the packet be reduced as much as possible.

However, in the case where the sequence number (SN) encoded according to the LSB encoding is transferred as the header of the packet, and where the number of bits assigned to the header is reduced, the number of bits expressible as the sequence number (SN) is limited. Moreover, in the LSB encoding into which the above-described sliding window method is introduced, a value used as the reference value (V_ref) is sequentially slid during the communication, and this also sequentially slides the interpretation interval in which the receiver can correctly decode the partial number bit string into the number bit string (V_target) by using the sequence number (SN).

For this reason, with the LSB encoding into which the sliding window method is introduced, in the case where the number of bits expressible as the sequence number (SN) is limited, and where a packet that does not belong to the current interpretation interval is retransmitted in response to an ARQ, the receiver cannot correctly decode a partial number bit string into a number bit string (V_target) by using the retransmitted packet. This causes a problem of breaking synchronization of the reference value (V_ref) between the transmitter and the receiver.

Instead, in order to avoid an occurrence of the above-described problem, information indicating that the received packet is the retransmitted packet may be added to the header. However, this produces another problem that the number of bits to be assigned to the header is undesirably increased.

SUMMARY OF THE INVENTION

The present invention has been made in consideration for such circumstances. An object of the present invention is to provide a communication system, a communication apparatus and a communication method, which allow a receiver side to more securely decode a part of a number bit string into the number bit string while using an encoding method such as the LSB encoding in a case of using the automatic retransmission control such as the ARQ. Here, the encoding method is one in which only a part of the number bit string is actually transmitted from the entire number bit string to be originally transmitted.

In order to achieve the above-described object, the present invention has features as below. A first feature of the present invention is summarized to be a communication system (communication system 10), in which an automatic retransmission control for a partial number bit string is executed. The communication system includes: a transmitter (wireless terminal 100) and a receiver (wireless base station 200). The transmitter is configured to encode a number bit string (13-bit sequence number) to be transferred into the partial number bit string (5-bit sequence number) as a part of the number bit string, and to transmit the encoded partial number bit string. The receiver is configured to decode the received partial number bit string into the number bit string while shifting an interval (interpretation interval $INT_{ALL}$) that is a range of a partial number bit string decodable into the number bit string, by using the partial number bit string and a reference value (LastSendAckNum, LastAckPeer) shared by the transmitter and the receiver. The transmitter includes an encoding processor (encoding/decoding processor 105) configured to perform the encoding for a future-direction interval (future-direction interval $INT_F$) associated with a partial number bit string to be transmitted after a newest partial number bit string (LastSendAckNum ±0) while taking, as a reference, the newest partial number bit string that is the last partial number bit string which the receiver has succeeded in receiving normally. The receiver includes a decoding processor (encoding/decoding processor 105) configured to perform the decoding for a past-direction interval (past-direction interval $INT_P$) associated with a partial number bit string transmitted at least prior to the newest partial number bit string while taking the newest partial number bit string as the reference.

According to the communication system as described above, the interval that is the range of the partial number bit string decodable into the number bit string includes the future-direction interval associated with the partial number bit string transmitted after the newest partial number bit string, and the past-direction interval associated with the partial number bit string transmitted prior to the newest partial number bit string. Moreover, the transmitter encodes the number bit string into the partial number bit string while setting the partial number bit string associated with the future-direction interval as the upper limit.

Accordingly, partial number bit strings beyond the range of the interval in the receiver are not retransmitted by the transmitter. Specifically, even when a packet storing the partial number bit string is retransmitted by the automatic retransmission control, the partial number bit string can be correctly decoded into the number bit string since the past-direction interval associated with the partial number bit string transmitted prior to the newest partial number bit string is provided.

A second feature of the present invention is summarized to be a communication apparatus configured: to receive, from a communication destination, a partial number bit string as a part of a number bit string to be transferred; to decode the received partial number bit string into the number bit string while sequentially shifting an interval that is a range of a partial number bit string decodable into the number bit string by using the partial number bit string and a reference value shared with the communication destination; and to execute an automatic retransmission control for the partial number bit string. The interval is composed of a future-direction interval and a past-direction interval. Specifically, while taking, as a reference, a newest partial number bit string that is the last partial number bit string having been received normally, the future-direction interval is associated with a partial number bit string transmitted after the newest partial number bit string, and the past-direction interval associated with a partial number bit string transmitted prior to the newest partial number bit string. In addition, the past-direction interval has a length longer than the future-direction interval. Moreover, the communication apparatus includes a decoding processor configured to perform the decoding for the past-direction intervals at least prior to the newest partial number bit string while taking the newest partial number bit as a reference.

A third feature of the present invention is summarized to be a communication apparatus configured: to receive a partial number bit string, which is a part of a number bit string to be transferred, from another different communication apparatus on a transmitter side that encodes and transmits the partial number bit string; to decode the received partial number bit string into the number bit string while sequentially shifting an interval that is a range of a partial number bit string decodable into the number bit string by using the received partial number bit string and a reference value shared with the different communication apparatus on the transmitter side; and to execute an automatic retransmission control for the partial number bit string. The communication apparatus includes an encoding processor configured to perform the encoding for a future-direction interval associated with a partial number bit string to be transmitted after a newest partial number bit string, while taking, as a reference, the newest partial number bit string that is the last partial number bit string which the different communication apparatus serving as the receiver has succeeded in receiving normally.

A fourth feature of the present invention is summarized to be a communication method for executing an automatic retransmission control for a partial number bit string that is a part of a number bit string to be transferred between a transmitter and a receiver. The method includes the steps of: encoding the number bit string into the partial number bit string by the transmitter, and transmitting the encoded partial number bit string from the transmitter to the receiver; and decoding the received partial number bit string into the number bit string by the receiver while an interval is sequentially shifted, the interval being a range of a partial number bit string decodable into the number bit string by using the received partial number bit string and a reference value shared between the transmitter and the receiver. The communication method further includes the steps of: performing the encoding by the transmitter for a future-direction interval associated with a partial number bit string to be transmitted after a newest partial number bit string (t1), while taking, as a reference, the newest partial number bit string that is the last partial number bit string which the receiver has succeeded in receiving normally: and performing the decoding by the receiver for a past-direction interval associated with a partial number bit string transmitted at least prior to the newest partial number bit string while taking the newest partial number bit string as the reference (t2 and t3).

According to the features of the present invention, the communication system, the communication apparatus and the communication method can be provided, which allow a receiver side to more surely decode a part of the number bit string into the number bit string while using an encoding method such as the LSB encoding in a case of using the automatic retransmission control such as the ARQ. Here, the encoding method is one in which only a part of the number bit string is actually transmitted from the entire number bit string to be originally transmitted.

BRIEF DESCRIPTION OF THE DRAWINGS

FIGS. 4A and 4B are configuration diagrams of packets transmitted/received by the communication apparatuses according to the embodiment of the present invention.

FIGS. 5A and 5B are explanatory views explaining used modes of RAMs provided in the communication apparatuses according to the embodiment of the present invention.

FIG. 6 is a diagram showing a configuration of an interpretation interval according to the embodiment of the present invention.

FIG. 7 is a diagram of a communication sequence executed between the communication apparatuses according to the embodiment of the present invention.

FIG. 8 is a diagram of a communication sequence executed between communication apparatuses according to a conventional example.

FIG. 9 is a diagram showing a relationship between 13-bit sequence numbers and 5-bit sequence numbers.

DESCRIPTION OF THE PREFERRED EMBODIMENTS

Figure 1:
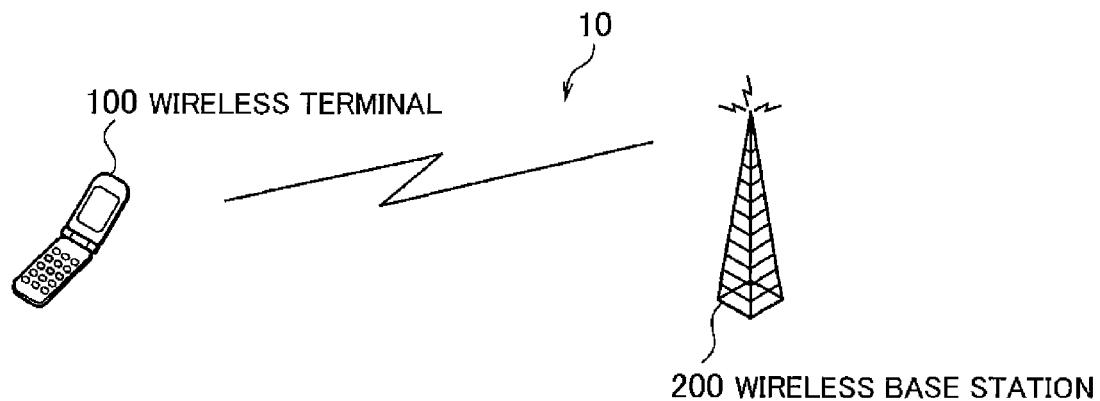
FIG. 1 is a schematic configuration diagram of an entire communication system according to an embodiment of the present invention.

Next, a description will be made of an embodiment of the present invention. Note that, in the following description with reference to the drawings, the same or similar reference numerals are assigned to the same or similar portions. However, it should be noted that the drawings are schematic ones, and that a ratio among the respective dimensions, and the like are different from actual ones.

Hence, specific dimensions and the like should be determined in consideration for the following description. Moreover, it is a matter of course that portions different in dimensional relationship and ratio are also included in the respective drawings.

(Schematic Configuration of Entire Communication System)

FIG. 1 is a schematic configuration diagram of an entire communication system according to this embodiment. As shown in FIG. 1, a communication system 10 is composed of a wireless terminal 100 and a wireless base station 200. Note that numbers and quantities of the wireless terminal 100 and the wireless base station 200, which are included in the communication system 10, are not limited to those shown in FIG. 1.

The communication system 10 employs LSB encoding in which only information (a partial number bit string) of the defined number of bits is transmitted from the least significant bits (LSB) in a number bit string to be transferred. Specifically, when a 13-bit sequence number is added to a packet, information of only five bits, i.e., a 5-bit sequence number, from the least significant bits (LSB) of the 13-bit sequence number is stored in a header of the packet and then transmitted (refer to FIG. 9).

A sliding window method is also introduced into the communication system 10. In the sliding window method, an interval, which is a range of the 5-bit sequence number decodable into the 13-bit sequence number, that is, an interpretation interval is sequentially slid by using the 5-bit sequence number stored in the header of the received packet and reference values (LastSendAckNum, LastAckPeer) shared between the wireless terminal 100 and the wireless base station 200.

Furthermore, an automatic repeat request (ARQ) of the packet is executed in the communication system 10.

(Functional Block Configuration of Communication System)

Figure 2:
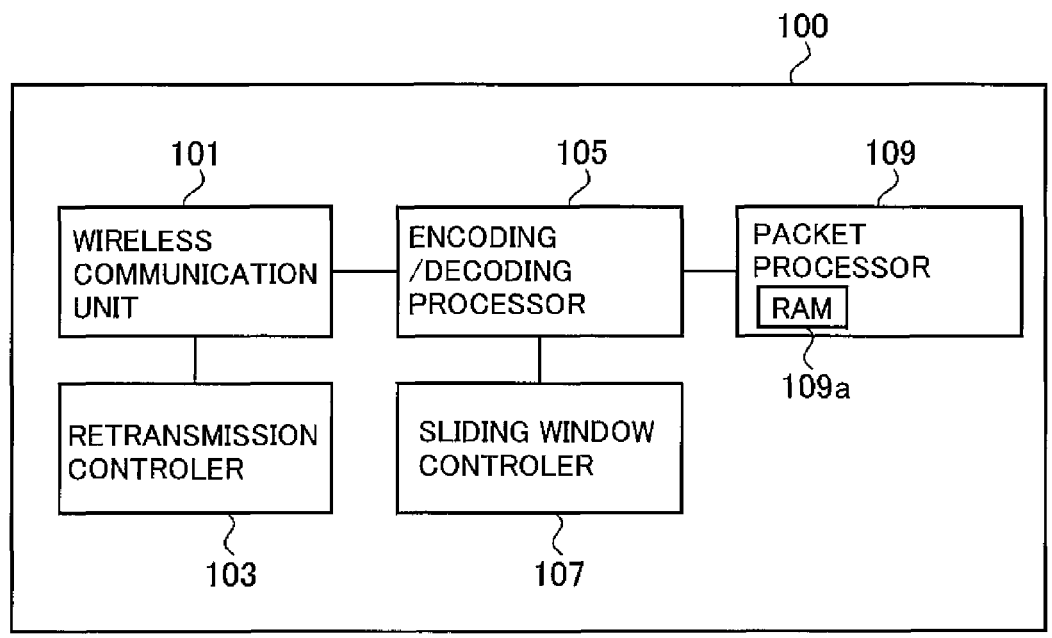
FIG. 2 is a functional block configuration diagram of a communication apparatus (wireless terminal) according to the embodiment of the present invention.
Figure 3:
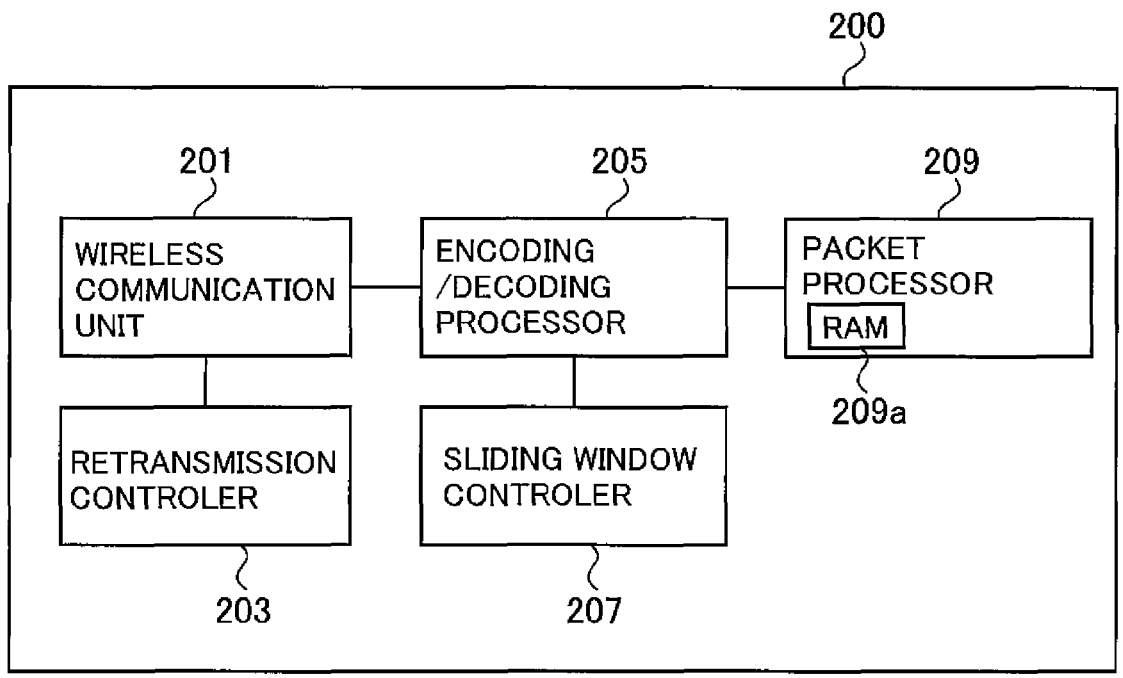
FIG. 3 is a functional block configuration diagram of a communication apparatus (wireless base station) according to the embodiment of the present invention.

FIG. 2 is a functional block configuration diagram of the communication apparatus 100. FIG. 3 is a functional block configuration diagram of the wireless base station 200. As shown in FIG. 2 and FIG. 3, the wireless terminal 100 and the wireless base station 200 have substantially similar functional block configurations.

Specifically, the wireless terminal 100 includes a wireless communication unit 101, a retransmission controller 103, an encoding/decoding processor 105, a sliding window controller 107, and a packet processor 109 (including a RAM 109a).

The wireless base station 200 includes a wireless communication unit 201, a retransmission controller 203, an encoding/decoding processor 205, a sliding window controller 207, and a packet processor 209 (including a RAM 209a).

A description will be made of the respective functional blocks of the wireless terminal 100, and a description of the respective functional blocks of the wireless base station 200 will be omitted. Moreover, a description will be made mainly of portions related to the present invention. Hence, it should be noted that, in some cases, the wireless terminal 100 and the wireless base station 200 include blocks (power supply unit and the like) which are essential to realize functions of the apparatuses concerned, but are not shown, or of which description is omitted. Note that, a description will be made of this embodiment by taking as an example an uplink communication from the wireless terminal 100 to the wireless base station 200; however, a downlink communication from the wireless base station 200 to the wireless terminal 100 is executed in a similar way.

The wireless communication unit 101 transmits/receives a wireless signal to/from the wireless base station 200. Moreover, the wireless communication unit 101 is connected to the encoding/decoding processor 105, and executes modulation/demodulation processing between a baseband signal including the packet and the like, and the wireless signal.

The retransmission controller 103 executes the automatic repeat request (ARQ) for the packet. In the ARQ, the sequence number added to the last packet (or data string) to be transmitted is stored in the header of the packet by a transmitter side, and then the transmitter side transmits the packet. A receiver side finds the last one of data strings that are continuous without being missed, among the data strings stored in the received packets, and then returns, as ack, the sequence number of the packet storing the last data string, to the transmitter side.

The transmitter side sometimes receives, as ack, an older sequence number than the sequence numbers of the already transmitted packets, i.e., a sequence number with a smaller numeric value. In this case, the transmitter side retransmits a packet storing a data string corresponding to the sequence number received as ack. Upon acquiring a missed portion of the data strings by the retransmitted packet, the receiver side returns, as ack, the sequence number of the packet storing the last data string, to the transmitter side.

The encoding/decoding processor 105 executes processing regarding the LSB encoding. Specifically, from the 13-bit sequence number added to the packet assembled by the packet processor 109, the encoding/decoding processor 105 stores the information with only five bits from the least significant bits (LSB), that is, the 5-bit sequence number in the header of the packet.

Moreover, the encoding/decoding processor 105 decodes the 5-bit sequence number stored in the header of the received packet into the 13-bit sequence number.

The sliding window controller 107 executes a control for the sliding window. Specifically, by using the 5-bit sequence number stored in the header of the received packet and the reference values shared between the wireless terminal 100 and the wireless base station 200, the sliding window controller 107 sequentially changes the interpretation interval, which is the range of the 5-bit sequence number decodable into the 13-bit sequence number, and specifically, sequentially slides the interpretation interval.

Note that the reference values shared between the wireless terminal 100 and the wireless base station 200 are values updated in cooperation between the wireless terminal 100 and the wireless base station 200. Specifically, in this embodiment, LastSendAckNum and LastAckPeer (refer to FIGS. 5A and 5B) are used as the reference values.

The packet processor 109 executes assembly and disassembly processing for the packet. Specifically, the packet processor 109 executes the assembly and disassembly processing for the packet while storing the data string stored in the packet in the RAM 109a.
(Packet Configuration)
Next, a description will be made of configurations of the packets transmitted/received by the wireless terminal 100 and the wireless base station 200. FIGS. 4A and 4B are configuration diagrams of the packets transmitted/received by the wireless terminal 100 and the wireless base station 200.

In this embodiment, a length of the packets Px and Py is fixed (76 bits). Each of the packets Px and Py is composed of a header HD and a payload PL. Moreover, the header HD of each of the packets Px and Py is defined as in the following table.

| Field name | Bit length | Contents of field |
|---|---|---|
| headerFormat | | 0: 13-bit sequence number<br>1: 5-bit sequence number |
| ack | | Sequence number of packet including last data string continuous without being missed in already received packets |
| scqNum | 5 or 13 | Sequence number of packet<br>when headerFormat is 0: store entire sequence number of packet<br>when headerFormat is 1: store lower-order five bits of sequence number of packet |

In this embodiment, a packet Px and a packet Py are used properly. The packet Px has the 13-bit sequence number stored in the header HD, as shown in FIG. 4A, while the packet Py has the information of only five bits, i.e., the 5-bit sequence number, from the least significant bits (LSB) of the 13-bit sequence number stored in the header HD, as shown in FIG. 4B.

The sequence numbers (13-bit sequence number, 5-bit sequence number) are associated with the packets (packets Px, Py) in this embodiment.

In the packet Px, a length of the header HD is 27 bits. Meanwhile, in the packet Py, a length of the header HD is 19 bits. Specifically, in the packet Py, the length of the header HD is shorter than that in the packet Px by 8 bits.

Each payload PL is composed of padding bits PB and data strings DB. Each padding bit PB is a bit for indicating a start position of the data string DB, and is a portion up to the first "1" in the payload PL. Specifically, a length of the padding bit is variable.

Each data string DB is located immediately after the padding bit PB. In the data string DB, a bit located immediately after the padding bit PB is an MSB of the first data byte (data byte 1), and the last bit of each of the packets Px and Py is the LSB of a data byte (for example, is data byte 6) located at the last position.

As shown in FIG. 4A, the packet Px in which the 13-bit sequence number is used can store data of up to six bytes. Meanwhile, as shown in FIG. 4B, the packet Py in which the 5-bit sequence number is used can store data of up to seven bytes. Note that, in each of the packets Px and Py, the payload PL can be composed only of the padding bits PB. In other words, the payload PL that does not include the data strings DB can be composed. A packet in which the payload PL is composed only of the padding bits PB is referred to as an "empty data packet" (refer to the lowermost rows of FIGS. 4A and 4B) in this embodiment.
(Used Mode of RAM)
Next, a description will be made of used modes of the RAM 109a composing the packet processor 109 of the wireless terminal 100 and of the RAM 209a composing the packet processor 209 of the wireless base station 200.

FIGS. 5A and 5B are explanatory views explaining the used modes of the RAM 109a and the RAM 209a. Note that a description will be made here of the case where the wireless terminal 100 transmits the packet Py to the wireless base station 200.

When the wireless terminal 100 and the wireless base station 200 have established a logical communication channel therebetween, the transmitter side (wireless terminal 100) and the receiver side (wireless base station 200) set initial values of the sequence numbers (13-bit sequence number, 5-bit sequence number) at "0."

The transmitter side manages the following variables.
LastSendNum: Sequence number of already transmitted last packet
LastAckPeer: Sequence number received as ack From the packet added with the next sequence number to LastAckPeer, the transmitter side stores the payload PL (data strings DB), which is stored in the packet added with LastSendNum, in advance as ack-waiting transmission data TD in the RAM 109a, and prepares for the retransmission of the packet.

Note that, since the sequence number has 13 bits, the sequence number can express 0 to 8191. Upon reaching 8191, the sequence number returns to 0, and values of 0 to 8191 are repeatedly used. Moreover, the "last" packet (or data strings) refers to the packet (or data strings) transmitted or received recently.

When a difference between the sequence number of the packet that is going to be transferred and LastAckPeer is $2^{(5-1)}-1$ or less, that is, 15 or less, the transmitter side does not use the 13-bit sequence number but uses the 5-bit sequence number.

Meanwhile, the receiver side manages the following variables.
LastSendAckNum: Sequence number of packet storing last data string continuous without being missed in data strings stored in received packets
LastReceiveNum: Sequence number of packet storing received last data string Note that, in FIG. 5B, already received data RD1 indicates the already received payload (data strings DB), and unreceived data RD2 indicates the payload PL (data strings DB) that has not been received yet.
(Interpretation Interval)
Next, a description will be made of the interpretation interval managed by the wireless terminal 100 and the wireless base station 200. FIG. 6 shows a configuration of the interpretation interval according to this embodiment. As described above, in this embodiment, since the 5-bit sequence number is used, a size of the interpretation interval $INT_{ALL}$ becomes 32 ($=2^5$) because of the LSB encoding.

The interpretation interval $INT_{ALL}$ is provided with a future-direction interval $INT_F$ and a past-direction interval $INT_P$. Here, assume that LastSendAckNum to (newest partial number bit string) denotes the last 5-bit sequence number which the wireless base station 200 has succeeded in receiving normally. While taking LastSendAckNum ±0 as a reference, the future-direction interval $INT_F$ is associated with 5-bit sequence numbers (LastSendAckNum to LastSendAckNum ±15) transmitted after LastSendAckNum ±0.

Meanwhile, while taking LastSendAckNum ±0 as the reference, the past-direction interval $INT_P$ is associated with 5-bit sequence numbers (LastSendAckNum −16 to LastSendAckNum −1) transmitted at least prior to LastSendAckNum ±0. Specifically, the future-direction interval $INT_F$ occupies substantially a half of the interpretation interval $INT_{ALL}$.

In this embodiment, the encoding/decoding processor 105 (the encoding/decoding processor 205) encodes the 13-bit sequence numbers into the 5-bit sequence numbers while setting, as an upper limit, the 5-bit sequence numbers associated with the future-direction interval $INT_F$. Specifically, the encoding/decoding processor 105 (the encoding/decoding processor 205) does not execute the LSB encoding for LastAckPeer beyond 15 ($=2^{(5-1)}-1$). Therefore, the receiver side (for example, wireless base station 200) does not receive 5-bit sequence numbers separated by 15 or more from LastSendAckNum as the reference. Specifically, the receiver side can decode the received 5-bit sequence numbers into the 13-bit sequence numbers without failing by using the future-direction interval $INT_F$.

Describing more in detail, even when ack (LastSendAckNum) is not normally returned to the transmitter side (for example, wireless terminal 100), it is guaranteed that a 5-bit sequence number of the packet retransmitted by the transmitter side becomes a value closer to a current point of time than LastSendAckNum −16. Specifically, the 5-bit sequence numbers which go out of a range of the interpretation interval $INT_{ALL}$ on the receiver side are not retransmitted by the retransmitter side.

(Operation of Communication System)

Next, a description will be made of an operation of the communication system 10. Specifically, a description will be made of an operation in which the wireless terminal 100 sequentially transmits the packets Py (refer to FIG. 4B) storing the 5-bit sequence numbers to the wireless base station 200.

(1) Operation According to this Embodiment

FIG. 7 is a diagram of communication sequence executed between the wireless terminal 100 and the wireless base station 200. It is assumed that the wireless terminal 100 and the wireless base station 200 have completed the establishment of the logical communication channel therebetween prior to the execution of the communication sequence shown in FIG. 7. The transmitter side (the wireless terminal 100) initializes the values of LastSendNum and LastAckPeer at 0. Meanwhile, the receiver side (the wireless base station 200) initializes the values of LastSendAckNum and LastReceiveNum at 0.

The wireless terminal 100 transmits a packet P1 storing the 5-bit sequence number to the wireless base station 200 (timing t1) "00001" (refer to SN=00001 in FIG. 1, the rest in the same way) representing the lower-order five bits of a 13-bit sequence number (00000000 00001) is added to the packet P1 as the 5-bit sequence number. Note that 00001 is located in the future-direction interval $INT_F$ in the interpretation interval $INT_{ALL}$.

Moreover, after transmitting the packet P1, the wireless terminal 100 updates the value of LastSendNum. Specifically, the wireless terminal 100 updates the value of LastSendNum from 00000 to 00001.

The wireless base station 200 receives the packet P1 (timing t2). The wireless base station 200 decodes the packet P1, and acquires the data strings Db included in the packet P1. Moreover, upon receiving the packet P1, the wireless base station 200 slides the interpretation interval $INT_{ALL}$ in the wireless base station 200 by one bit. In this case, the wireless base station 200 updates the value of LastReceiveNum from 00000 to 00001.

When the wireless base station 200 has succeeded in decoding normally the packet P1, the wireless base station 200 returns ack1 indicating that it has succeeded in receiving normally the packet P1 to the wireless terminal 100 (timing t3). After transmitting ack1, the wireless base station 200 updates the value of LastSendAckNum. Specifically, the wireless base station 200 updates the value of LastSendAckNum from 00000 to 00001.

Upon receiving ack1 from the wireless base station 200, the wireless terminal 100 updates the value of LastAckPeer (timing t4). Specifically, the wireless terminal 100 updates the value of LastAckPeer from 00000 to 00001. Moreover, in this case, the wireless terminal 100 slides the future-direction interval $INT_F$ in the wireless terminal 100 by one bit.

In the rest, in the same way as the packet P1, packets P2 to P5 are transmitted from the wireless terminal 100 to the wireless base station 200.

Here, it is assumed that ack4 is lost in the wireless section. Specifically, the following case is assumed. First, the wireless base station 200 receives the packet P4 (timing t5). Then, the wireless base station 200 updates the value of LastReceiveNum. Specifically, the wireless base station 200 updates the value of LastReceiveNum from 00011 to 00100.

Since the wireless base station 200 has succeeded in receiving the packet P4, the wireless base station 200 returns ack4 indicating that it has succeeded in receiving the packet P4 normally to the wireless terminal 100. However, the wireless terminal 100 has not succeeded in receiving ack4.

Subsequently, the wireless base station 200 receives the packet P5 (timing t6). Upon receiving the packet P5, the wireless base station 200 slides the interpretation interval $INT_{ALL}$ in the wireless base station 200 by one bit. As a result, the value of LastReceiveNum is updated from 00100 to 00101.

Moreover, after transmitting ack5, the wireless base station 200 updates the value of LastSendAckNum in a similar way to LastReceiveNum.

Meanwhile, since the wireless terminal 100 has not received ack4, the wireless terminal 100 does not slide the value of LastAckPeer even if it receives ack5. Specifically, with regard to the value of LastAckPeer, the value 00011 updated at the point of time when the wireless terminal 100 received ack3 is held.

Subsequently, since the wireless terminal 100 has not received ack4 from the wireless base station 200, the wireless terminal 100 retransmits the packet P4 to the wireless base station 200 (timing t7). With regard to the value of LastAckPeer, the value 00011 updated at the point of time when the wireless terminal 100 received ack3 is held. Accordingly, the wireless terminal 100 can encode a 13-bit sequence number (00000000 00100) of the retransmitted packet P4 into the 5-bit sequence number (00100).

The wireless base station 200 receives the retransmitted packet P4 (timing t8). The wireless base station 200 has already updated the value of LastReceiveNum to 00101 at the point of time (timing t6) when it received the packet P5; however, in this embodiment, since the interpretation interval $INT_{ALL}$ is provided also in the past-direction interval $INT_P$, the wireless base station 200 can decode the 5-bit sequence number (00100) added to the packet P4 into the 13-bit sequence number (00000000 00100) without an error.

(2) Operation According to Conventional Example

Next, in order to compare a conventional example with the above-described embodiment, a description will be made, with reference to FIG. 8 and FIG. 9, of an operation in which a wireless terminal sequentially transmits the packets Py (refer to FIG. 4B) storing the 5-bit sequence numbers to a wireless base station in a communication system according to the conventional example.

FIG. 8 is a diagram of a communication sequence executed between the wireless terminal and the wireless base station according to the conventional example. In the communication sequence concerned, it is assumed that the packets P1 to P5 are transmitted from the wireless terminal to the wireless base station and that ack4 is lost in the wireless section in a similar way to the communication sequence between the wireless terminal 100 and the wireless base station 200 according to this embodiment, which is shown in FIG. 7.

Operations from timing t1 to timing t7 are similar to those of the wireless terminal 100 and the wireless base station 200 according to this embodiment.

The wireless base station receives the retransmitted packet P4 (timing t8). At the point of time (timing t6) when the wireless base station received the packet P5, the wireless base station has already updated the value of LastReceiveNum to 00101. In the conventional example, the interpretation interval $INT_{ALL}$ is not provided in the past direction.

Accordingly, as shown in FIG. 9, upon receiving the 5-bit sequence number (00100) added to the retransmitted packet P4, the wireless base station recognizes that the received value is 100100 (=36) that is more in the future direction than the held value (00101) of LastReceiveNum, that is, a larger value than 00100 (refer to underlined portions in FIG. 9). As a result, the wireless base station erroneously recognizes that the retransmitted packet P4 is a packet transmitted for the thirty-sixth time.

(3) Consideration of Alternative Solution Related to Retransmission of Packet

Although the 5-bit sequence numbers are used in the entirety of the communication sequence in the above-described embodiment, a solution is considered, that uses not the 5-bit sequence number but the 13-bit sequence number only when the packet is retransmitted in order to avoid the above-described problem in the conventional example.

Figure 10:
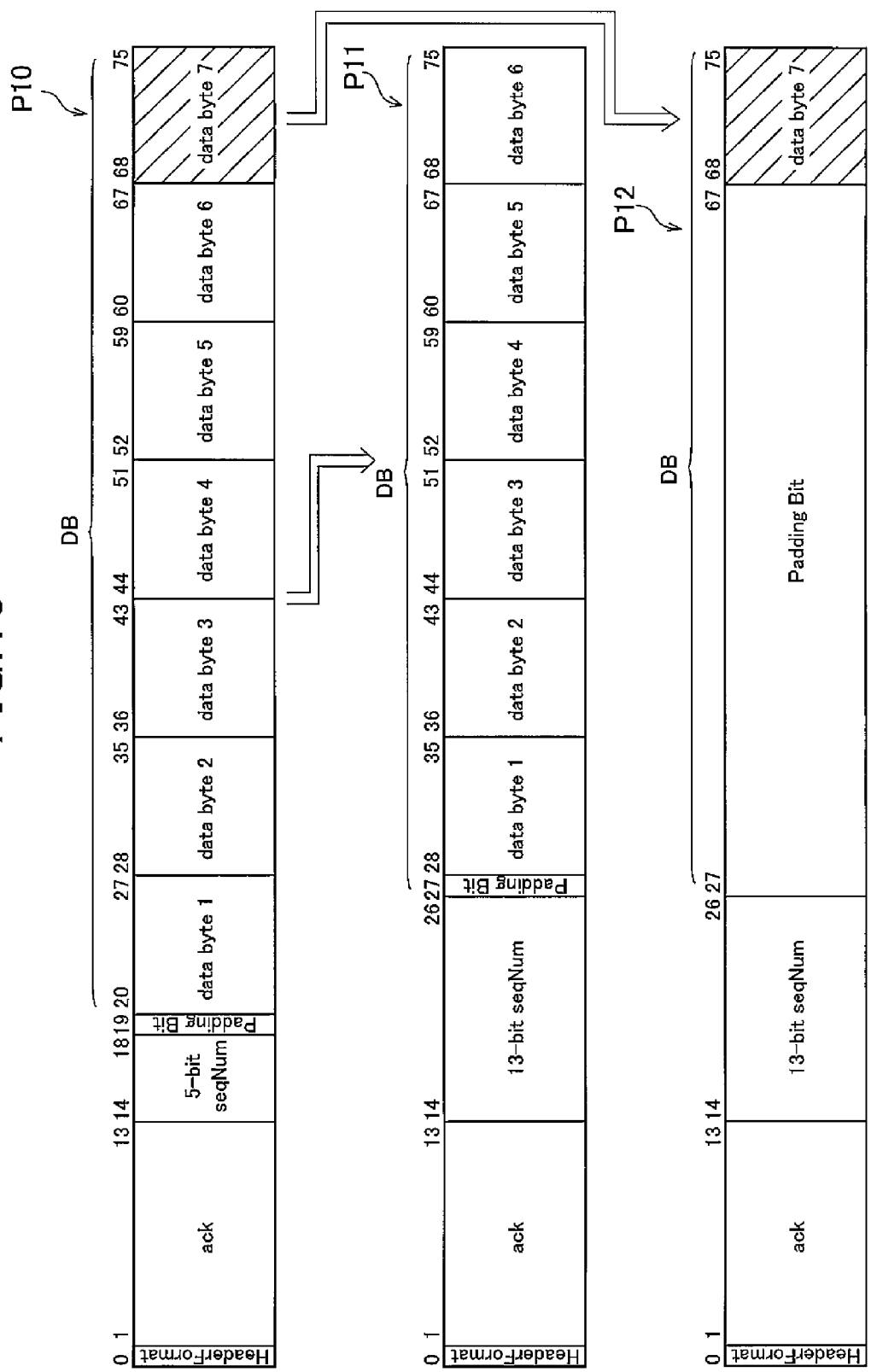
FIG. 10 is a diagram showing an example of retransmitted packets according to the embodiment of the present invention.

However, in such a method, another problem as below sometimes occurs. Specifically, as shown in FIG. 10, in a packet P10 added with a 5-bit sequence number, data of up to seven bytes (data bytes 1 to 7) can be stored in data strings DB.

In the case where the packet P10 is retransmitted and where a 13-bit sequence number rather than the 5-bit sequence number is used, data storable in data strings DB of a packet P11 is up to six bytes (49 bits=bits 27 to 75). Therefore, the data of seven bytes cannot be stored in the packet P11. Accordingly, the data (data byte 7) that is not storable in the packet P11 must be stored in a packet P12 other than the packet P11.

Specifically, when the packet P10 is retransmitted by using the 13-bit sequence number, two packets, the packet P11 and the packet P12, must be retransmitted. Therefore, in some cases, a throughput of the data, which follows the retransmission, decreases to a large extent. For example, when a large number of the packets are lost in the wireless section owing to a deterioration of a frame error rate (FER), the retransmission of the lost packet occurs frequently, whereby the throughput of the data decreases to a large extent. When such a situation occurs, the throughput of the data at the time of the retransmission decreases to a large extent though the throughput of the data is enhanced by reducing the sequence number from 13 bits to five bits according to the LSB encoding.

In this embodiment, also in the case of retransmitting the packet, the wireless terminal 100 (encoding/decoding processor 105) and the wireless base station 200 (encoding/decoding processor 205) encode the 13-bit sequence number into the 5-bit sequence number by using the 5-bit sequence number while setting the 5-bit sequence numbers associated with the future-direction interval $INT_F$ as the upper limit. Therefore, also in the retransmission of the packet, the data of seven bytes can be stored, and the aforementioned decrease of the throughput of the data does not occur.

Moreover, in this embodiment, since the 5-bit sequence number is used also when the packet is retransmitted, the same sequence number used when the packet is transmitted can be used also in the retransmitted packet.

(Function/Effect)

According to the communication system 10, in the interpretation interval $INT_{ALL}$, the future-direction interval $INT_F$ and the past-direction interval $INT_P$ are provided. The future-direction interval $INT_F$ is associated with the 5-bit sequence numbers transmitted after LastSendAckNum ±0 (refer to FIG. 6), and the past-direction interval $INT_P$ is associated with the 5-bit sequence numbers transmitted prior to LastSendAckNum ±0. Moreover, the transmitter side encodes the 13-bit sequence numbers into the 5-bit sequence numbers while setting the 5-bit sequence numbers associated with the future-direction interval $INT_F$ as the upper limit.

Thus, the 5-bit sequence numbers which go out of the range of the interpretation interval $INT_{ALL}$ on the receiver side are not retransmitted by the transmitter side. Specifically, even when the packet storing the 5-bit sequence number is retransmitted by the ARQ, the 5-bit sequence number can be correctly decoded into the 13-bit sequence number since the past-direction interval $INT_P$ associated with the 5-bit sequence numbers transmitted prior to LastSendAckNum ±0 is provided.

In this embodiment, the future-direction interval $INT_F$ occupies substantially a half of the interpretation interval $INT_{ALL}$. Therefore, even when the packet is retransmitted, the 5-bit sequence number can be decoded into the 13-bit sequence number correctly and surely while increasing the number (so-called outstanding number) of packets transmittable without confirming ack.

In this embodiment, the 5-bit sequence number is used also when the packet is retransmitted, and accordingly, the throughput of the data can be prevented from decreasing following the aforementioned increase of the number of retransmitted packets.

Other Embodiments

As described above, the contents of the present invention have been disclosed throughout the embodiment of the present invention. However, it should not be understood that the statement and the drawings each forming a part of this disclosure limit the present invention. From this disclosure, a variety of alternative embodiments will be apparent to those skilled in the art.

For example, in the above-described embodiment, the sequence numbers (13-bit sequence number, 5-bit sequence number) are associated with the packets; however, the sequence numbers may be associated with the data strings included in each packet, and specifically, with the data bytes 1 to 7. In general, in such a case where the size of the payload PL is changed when the packet is retransmitted, the sequence numbers are preferably to be associated per data byte with the packet.

Moreover, in the above-described embodiment, the future-direction interval $INT_F$ and the past-direction interval $INT_P$ are intervals substantially equal to each other; however, the past-direction interval $INT_P$ just needs to have a length more than the future-direction interval $INT_F$.

Furthermore, in the above-described embodiment, the 13-bit sequence number and the 5-bit sequence number are used; however, it is not always necessary that the numbers of bits for use in the sequence numbers are 13 bits and five bits.

As described above, it is a matter of course that the present invention incorporates a variety of embodiments which are not described herein. Hence, the technical scope of the present invention should be determined only by items specifying the invention, which are according to the scope of claims reasonable from the above description.

What is claimed is:

1. A communication system in which an automatic retransmission control for a partial number bit string is executed, the communication system comprising:
    a transmitter configured to encode a number bit string to be transferred into the partial number bit string as a part of the number bit string and to transmit the encoded partial number bit string; and
    a receiver configured to receive the partial number bit string and to decode the partial bit number string into the number bit string while shifting an interval that is a range of a partial number bit string decodable into the number bit string by using the received partial number bit string and a reference value shared by the transmitter and the receiver, wherein
    the transmitter includes an encoding processor configured to perform the encoding for a future-direction interval associated with a partial number bit string to be transmitted after a newest partial number bit string while taking, as a reference, the newest partial number bit string that is the partial number bit string which the receiver has succeeded in receiving normally, and
    the receiver includes a decoding processor configured to perform the decoding for a past-direction interval associated with a partial number bit string transmitted at least prior to the newest partial number bit string while taking the newest partial number bit string as the reference.

2. The communication system according to claim 1, wherein the past-direction interval has a length more than the future-direction interval.

3. The communication system according to claim 1, wherein the interval as the range of the partial number bit string decodable into the number bit string by the receiver is composed of the future-direction interval and the past-direction interval,
    the future-direction interval occupies substantially a half of the interval as the range of the partial number bit string decodable into the number bit string by the receiver, and
    the encoding processor encodes the number bit string into the partial number bit string while setting, as an upper limit, the partial number bit string associated with the future-direction interval.

4. The communication system according to claim 1, wherein, in a case of retransmitting the partial number bit string, the encoding processor encodes the number bit string into the partial number bit string while setting, as an upper limit, the partial number bit string associated with the future-direction interval.

5. The communication system according to claim 1, wherein
    the partial number bit string is stored in a packet, and
    the partial number bit string is associated with the packet.

6. The communication system according to claim 1, wherein
    the partial number bit string is stored in a packet, and
    the partial number bit string is associated with a data string stored in the packet.

7. A communication apparatus configured to receive, from a communication destination, a partial number bit string as a part of a number bit string to be transferred, to decode the received partial number bit string into the number bit string while sequentially changing an interval as a range of a partial number bit string decodable into the number bit string by using the partial number bit string and a reference value shared with the communication destination, and to execute an automatic retransmission control for the partial number bit string, the communication apparatus comprising:
    a decoding processor configured to perform, while taking, as a reference, a newest partial number bit string as the partial number bit string which the communication apparatus has succeeded in receiving normally, the decoding for a past-direction interval at least from the newest partial number bit string, wherein
    the interval is composed of a future-direction interval associated with a partial number bit string transmitted after the newest partial number bit string, and the past-direction interval associated with a partial number bit string transmitted prior to the newest partial number bit string while taking the newest partial number bit string as the reference, and
    the past-direction interval has a length more than the future-direction interval.

8. A communication apparatus configured to receive a partial number bit string, which is a part of a number bit string to be transferred, from another different communication apparatus on a transmitter side that encodes and transmits the partial number bit string, to decode the received partial number bit string into the number bit string while sequentially shifting an interval that is a range of a partial number bit string decodable into the number bit string by using the received partial number bit string and a reference value shared with the different communication apparatus on the transmitter side, and to execute an automatic retransmission control for the partial number bit string, the communication apparatus comprising
    an encoding processor configured to perform the encoding for a future-direction interval associated with a partial number bit string to be transmitted after a newest partial number bit string, while taking, as a reference, the newest partial number bit string that is the last partial number bit string which the different communication apparatus serving as the receiver has succeeded in receiving normally.

9. The communication apparatus according to claim 8, wherein
    the future-direction interval is composed to occupy substantially a half of the interval that is the range of the partial number bit string decodable into the number bit string by the different communication apparatus at a time of serving the receiver, and
    the encoding processor encodes the number bit string into the partial number bit string while setting, as an upper limit, the partial number bit string associated with the future-direction interval.

10. The communication apparatus according to claim 8, wherein, in a case of retransmitting the partial number bit string, the encoding processor encodes the number bit string into the partial number bit string while setting, as an upper limit, the partial number bit string associated with the future-direction interval.

11. The communication apparatus according to claim 7, wherein
    the partial number bit string is stored in a packet, and
    the partial number bit string is associated with the packet.

12. The communication apparatus according to claim 7, wherein
    the partial number bit string is stored in a packet, and the partial number bit string is associated with a data string stored in the packet.

13. The communication apparatus according to claim 7, wherein
the partial number bit string is stored in a packet, and
the partial number bit string is associated with the packet.

14. The communication apparatus according to claim 7, wherein
the partial number bit string is stored in a packet, and
the partial number bit string is associated with a data string stored in the packet.

15. A communication method for executing an automatic retransmission control for a partial number bit string that is a part of a number bit string to be transferred between a transmitter and a receiver, the method comprising the steps of:
  encoding the number bit string by the transmitter into the partial number bit string, and transmitting the encoded partial number bit string from the transmitter to the receiver; and
  decoding the received partial number bit string into the number bit string by the receiver while an interval is sequentially shifted, the interval being a range of a partial number bit string decodable into the number bit string by using the received partial number bit string and a reference value shared between the transmitter and the receiver, the communication method further comprising the steps of:
performing the encoding by the transmitter for a future-direction interval associated with a partial number bit string to be transmitted after a newest partial number bit string, while taking, as a reference, the newest partial number bit string that is the last partial number bit string which the receiver has succeeded in receiving normally; and
performing the decoding by the receiver for a past-direction interval associated with a partial number bit string transmitted at least prior to the newest partial number bit string while taking the newest partial number bit string as the reference.

* * * * *